May 19, 1970     G. KERR     3,512,801
VERSATILE BICYCLE
Filed Oct. 18, 1968
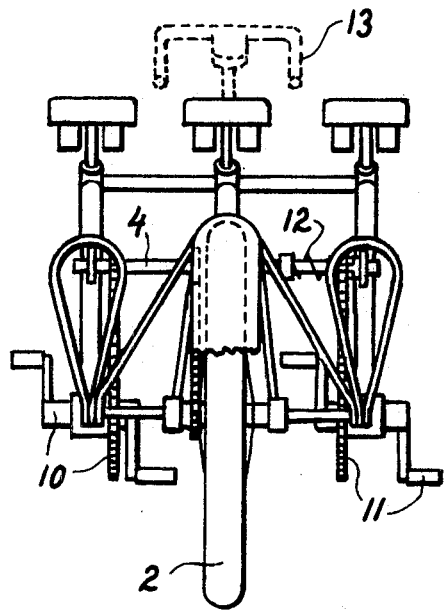
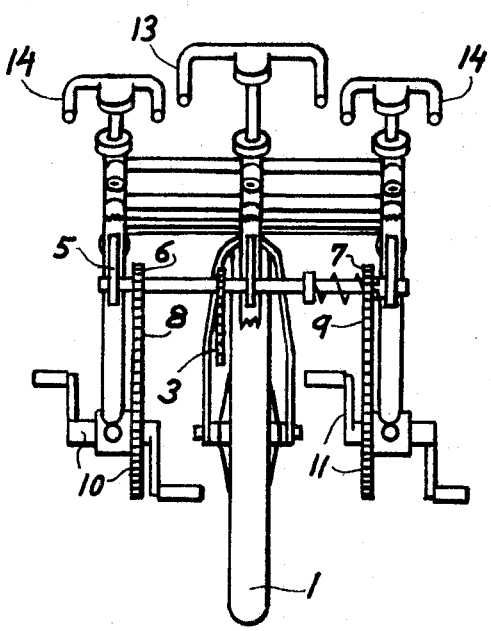
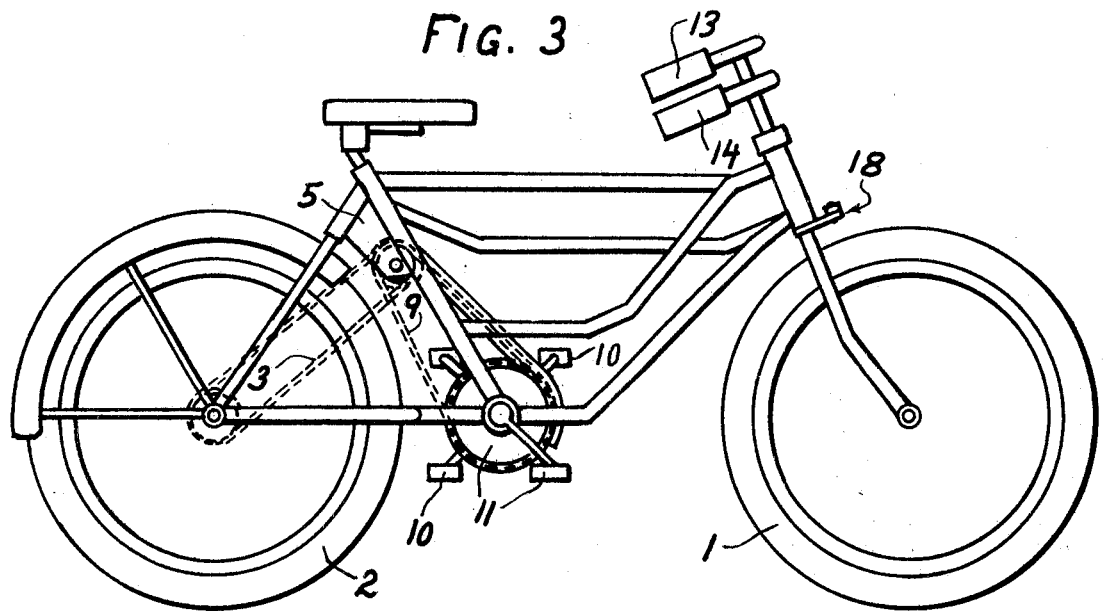
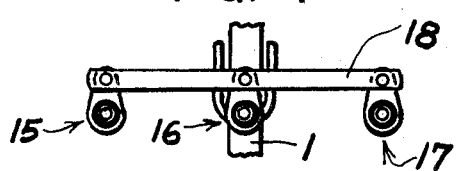
INVENTOR
GEORGE L. KERR
BY Krafft & Wells
ATTORNEYS United States Patent Office 3,512,801
Patented May 19, 1970

3,512,801
VERSATILE BICYCLE
George L. Kerr, Box 153, Okeene, Okla. 73763
Filed Oct. 18, 1968, Ser. No. 768,833
Int. Cl. B62m 1/20
U.S. Cl. 280—231                      2 Claims

ABSTRACT OF THE DISCLOSURE

A bicycle which can be operated in the usual manner by one person, either with or without a passenger, but which can also be operated and propelled by the combined efforts of two people, and in either case can also carry a third person. This is made possible by rigidly attaching three bicycle frames of usual construction parallel to one another, removing the pedals and pedal shaft from the frame in the middle and the two track wheels from each side frame. The three steering columns are then linked together for operation in unison and a transverse countershaft is positioned beneath the seats to transmit the propulsion from a pedal-operated sprocket wheel on each side frame through intermediate sprockets on the countershaft to the rear bicycle wheel of the middle frame.

BACKGROUND OF THE INVENTION

The field of the invention is land vehicles having interconnected plural occupant propelled means.

The state of the prior art may be ascertained by reference to U.S. Pats. 413,189; 563,957; and 605,365 of Kirk, Grilli and Weaver, respectively.

SUMMARY OF THE INVENTION

The invention is a modified bicycle which can not only be propelled in the usual manner by a single person, but which can also be propelled by the combined efforts of two people, and which would be able to carry an extra passenger or two with a maximum carrying capacity of three people.

The versatile bicycle of the present invention is a composite of three bicycles rigidly connected to one another in parallelism and with certain parts of each component bicycle removed, but with the addition of a countershaft in the transmission mechanism and a parallel motion linkage in the steering mechanism. The pedals and sprocket shaft are removed from the middle bicycle while the two supporting wheels are removed from the two bicycles at the sides. The specific manner of connecting the three bicycle frames to one another is subject to considerable variation and depends on the specific constructions of the individual frame.

DESCRIPTION OF THE DRAWING

The invention will be further decsribed with reference to the drawing wherein:

FIG. 1 is a view of the bicycle from the rear, the parts in front being omitted;

FIG. 2 is also a view from the rear, but with the rear wheel and the seats removed;

FIG. 3 is a side view of the complete bicycle; and

FIG. 4 is a detail of the steering mechanism.

In the present invention the entire composite bicycle is supported by the front and rear wheels 1 and 2 of the unit in the middle, from which the pedals and sprocket wheel have been removed. Instead of leaving the rear wheel 2 connected directly to its individual sprocket wheel, it is connected by a drive chain 3 to a countershaft 4 rotatably supported by gusset plates 5. The countershaft 4 has attached thereto near one end thereof a drive sprocket 6, and near its other end it is connected by a four position jaw clutch to a similar drive sprocket 7. The sprockets 6 and 7 are driven by chains 8 and 9 which are actuated by the usual pedaling mechanism 10 and 11. The reason for interposing the four position jaw clutch between the sprocket 7 and the shaft 4 is to permit angular adjustment of the pedals 10 on one side of the vehicle with the pedals 11 on the other side of the vehicle, and by providing a suitable coiled spring 12 instead of set screws to keep the clutch in its adjusted position, it can easily be moved into other positions by hand without the use of tools.

DESCRIPTION OF USING THE EMBODIMENTS

For example, it may be desirable occasionally for the vehicle to be used by only one person who would then obtain the best balance by occupying the seat in the middle and operating the pedaling mechanism 10 with one foot and the pedaling mechanism 11 on the other side of the vehicle with the other foot. This, however, would require the pedaling devices 10 and 11 to be set 180° from each other whereas on other occasions when there are two people to contribute to the propulsion, it may be found more advantageous to set the two pedaling devices 90° or 270° from each other.

If the vehicle is to be operated by only one person, it may be advantageous to completely remove the handlebars from the two sides of the vehicle and to use only the central handlebars 13 as suggested in FIG. 1, but if two people contribute to the propulsion, then the two handlebars 14 at the sides would be used, and in that case it may be advantageous to completely remove the central handlebars.

In order to permit the vehicle to be steered either by the central handlebar or by the two at the sides, the three steering columns 15, 16, 17 are connected to one another by parallel motion mechanism 18 for operation in unison.

It will be understood that this invention is susceptible to modification in order to adapt it to different usages and conditions and, accordingly, it is desired to comprehend such modifications within this invention as may fall within the scope of the appended claims.

I claim:

1. A convertible bicycle adapted to be propelled either by one person or by the combined efforts of two people consisting essentially of a central bicycle portion including a seat and a steering column but without any pedaling mechanism and on each side thereof and parallel thereto an ancillary bicycle section including a seat and a steering column with pedaling mechanism but without any roadway wheels, a transverse countershaft beneath the bicycle seats and connected by a drive chain with the rear bicycle wheel and also by a drive chain to the pedaling mechanism of each ancillary bicycle section, and parallel motion mechanism connecting the three steering columns for operation in unison with one another, said pedaling mechanisms of soid ancillary bicycles being so operably located in the proximity of said central bicycle portion that said convertible bicycle can be propelled by one person using the inner pedal of each of said pedaling mechanisms.

2. The convertible bicycle of claim 1, in which one of the pedaling mechanisms is connected by a drive chain to a sprocket wheel on the countershaft, the sprocket wheel being releasably connected to the countershaft by means of a four jaw manually releasable clutch equipped with a spring to keep it closed in any one of four different positions.

References Cited

UNITED STATES PATENTS

| Re. 11,561 | 8/1896 | Weaver | 280—231 |
| 413,189 | 10/1889 | Kirk | 280—231 |
| 563,957 | 7/1896 | Grilli | 280—231 |
| 605,365 | 6/1898 | Weaver | 280—231 |

BENJAMIN HERSH, Primary Examiner

R. R. SONG, Assistant Examiner